United States Patent
Bureau et al.

(10) Patent No.: US 7,251,946 B2
(45) Date of Patent: Aug. 7, 2007

(54) METHOD FOR CONTROLLING EVAPORATION TEMPERATURE IN AN AIR CONDITIONING SYSTEM

(75) Inventors: Cathy Bureau, Stuttgart (DE); Stefan Morgenstern, Stuttgart (DE)

(73) Assignee: BEHR GmbH & Co. KG, Stuttgart (DE)

( * ) Notice: Subject to any disclaimer, the term of this patent is extended or adjusted under 35 U.S.C. 154(b) by 187 days.

(21) Appl. No.: 10/530,760

(22) PCT Filed: Sep. 1, 2003

(86) PCT No.: PCT/EP03/09676

§ 371 (c)(1),
(2), (4) Date: Apr. 8, 2005

(87) PCT Pub. No.: WO2004/035335

PCT Pub. Date: Apr. 29, 2004

(65) Prior Publication Data
US 2006/0000232 A1    Jan. 5, 2006

(30) Foreign Application Priority Data
Oct. 10, 2002   (DE) .................... 102 47 262

(51) Int. Cl.
*F25B 1/00*    (2006.01)
(52) U.S. Cl. .................... 62/115; 62/513
(58) Field of Classification Search ........... 62/244, 62/430, 504, 524, 515, 527, 115, 513
See application file for complete search history.

(56) References Cited

U.S. PATENT DOCUMENTS

| | | | | |
|---|---|---|---|---|
| 4,679,410 A | * | 7/1987 | Drayer .................... | 62/503 |
| 4,745,778 A | * | 5/1988 | Carella et al. ............ | 62/512 |
| 5,180,004 A | * | 1/1993 | Nguyen .................... | 165/140 |
| 5,505,060 A | * | 4/1996 | Kozinski .................. | 62/503 |
| 5,678,422 A | * | 10/1997 | Yoshii et al. .............. | 62/513 |
| 5,931,020 A | * | 8/1999 | Nakamura ................ | 62/527 |
| 6,016,662 A | | 1/2000 | Tanaka et al. | |
| 6,029,466 A | | 2/2000 | Wiezt | |
| 6,185,957 B1 | * | 2/2001 | Voss et al. ................ | 62/513 |
| 6,189,604 B1 | * | 2/2001 | Yamauchi et al. ........ | 165/140 |
| 6,334,325 B1 | | 1/2002 | Herpel et al. | |
| 6,691,527 B2 | | 2/2004 | Bureau et al. | |
| 6,854,513 B2 | | 2/2005 | Shirota et al. | |

FOREIGN PATENT DOCUMENTS

| | | |
|---|---|---|
| DE | 197 28 578 A1 | 2/1999 |
| DE | 101 24 757 A | 11/2001 |
| DE | 201 15 273 U | 5/2002 |
| DE | 101 56 944 A1 | 7/2002 |
| JP | 2000-205777 A * | 7/2000 |
| JP | 2001-153489 A * | 6/2001 |

* cited by examiner

*Primary Examiner*—Mohammad M. Ali
(74) *Attorney, Agent, or Firm*—Foley & Lardner LLP

(57) ABSTRACT

A method for controlling evaporation temperature in an air conditioning system, especially an air conditioning system in a motor vehicle, comprising a latent cold accumulator which can be cooled by an evaporator (1). The evaporation temperature of a coolant is adjusted inside the evaporator (1) according to requirement to a value lying between a minimum temperature (T_min) and a maximum temperature (T_max) lying below the phase transition temperature of the latent medium.

4 Claims, 3 Drawing Sheets

METHOD FOR CONTROLLING EVAPORATION TEMPERATURE IN AN AIR CONDITIONING SYSTEM

Figure 1A:
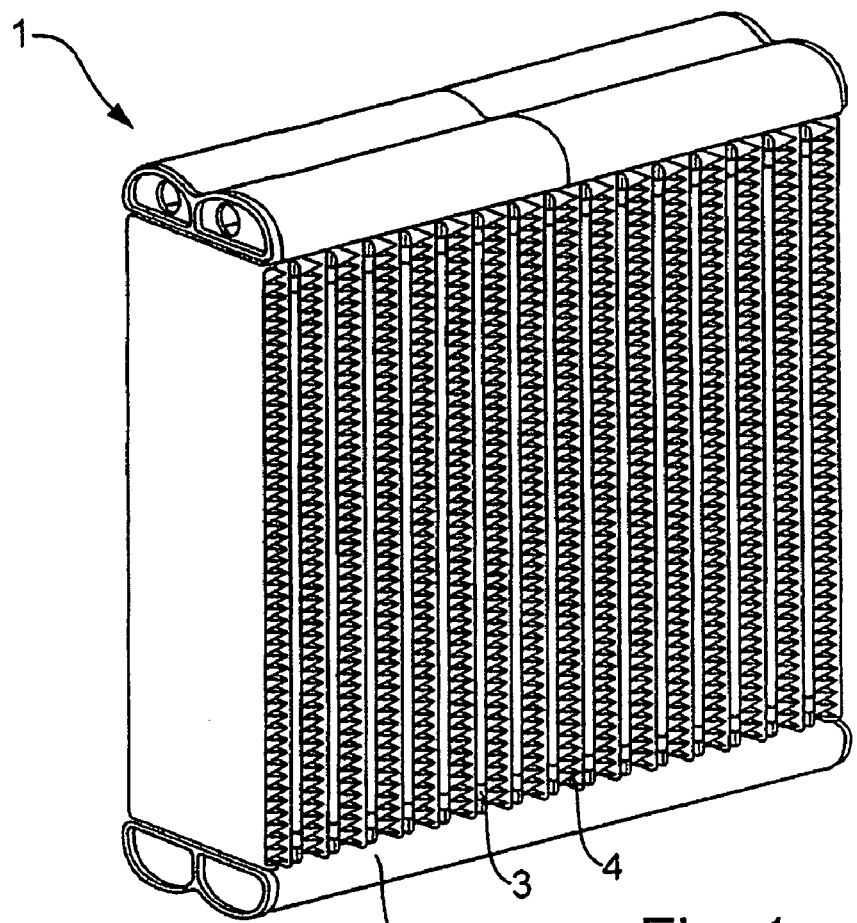

The invention relates to a method for controlling evaporation temperature in an air conditioning system, in particular a vehicle air conditioning system.

A method for controlling the evaporator temperature in a vehicle air conditioning system is known, for example, from DE 199 20 093 C1. To avoid unnecessary energy consumption, the evaporator temperature is to be set to a temperature level which takes account of both comfort and safety aspects. In this context, both the atmospheric humidity and the required cooling capacity are taken into consideration.

A further evaporator temperature control, which is dependent on the outside dewpoint, for a motor vehicle air conditioning system is known, for example, from DE 197 28 578 C2. In this case, the evaporator temperature is dependent on the difference between air temperature and dewpoint.

However, the methods listed have the drawback that there is no refrigeration accumulator, and therefore the respective air conditioning system cannot be used when the vehicle is stationary and therefore the compressor of the air conditioning system is not operating.

A vehicle air conditioning system having a refrigeration accumulator is known, for example, from DE 101 56 944 A1. In this case, a refrigerant evaporator, for example a flat tube evaporator, has a number of accumulators filled with a refrigeration accumulator medium. Refrigeration accumulator media mentioned include decanol and tetradecane. When the evaporator is operating, the refrigeration accumulator medium is cooled to a temperature below the melting point of the refrigeration accumulator medium. This creates a latent accumulator which allows the cooling to be temporarily maintained when the vehicle and the refrigeration circuit are temporary stationary.

The invention is based on the object of providing a method with which an air conditioning system, in particular a vehicle air conditioning system, having a latent refrigeration accumulator can be operated particularly economically.

This object is achieved according to the invention by a method having the features of claim 1. This provides the possibility of controlling evaporation temperature in an air conditioning system that includes a latent refrigeration accumulator. The evaporation temperature of the refrigerant of the air conditioning system is in this case varied as a function of demand between a minimum temperature and a maximum temperature, which is below a phase change temperature of the latent medium. The minimum temperature is preferably selected in such a manner that there is no possibility of the evaporator icing up. The melting point of the latent medium contained in the latent refrigeration accumulator is preferably slightly above 0° C. Decanol (melting point 7° C.) and tetradecane (melting 6° C.), as well as substance mixtures containing at least one of these substances, are particularly suitable for use as the latent medium. The maximum temperature of the evaporator is preferably set to a temperature slightly below the melting point of the latent medium. Therefore, the evaporation temperature is always in a range in which both full usability of the latent medium is ensured and icing of the evaporator is avoided.

The method is suitable in particular for air conditioning systems in vehicles which include what is known as the idle-stop operating mode. In this case, the vehicle engine is automatically switched off when the vehicle is stationary for a short period of time, for example when it has stopped at traffic lights. This also deactivates the compressor of the air conditioning system. The melting point of the latent medium should on the one hand be high enough to enable the evaporator with evaporator temperature control, also known as ETC, to operate in the widest possible range. On the other hand, the melting point of the latent medium should be low enough to allow a sufficient cooling action to be maintained for a limited period of time when the refrigeration circuit is stationary. The refrigeration storage media mentioned above, namely decanol and tetradecane, take sufficient account of these completing conditions.

The advantage of the invention is in particular that operation of an evaporator of a motor vehicle air conditioning system with a controlled evaporation temperature, the upper limit of which is formed by the melting point of a latent medium, allows both particularly economical operation of the air conditioning system and the cooling operation to be temporarily maintained when the refrigeration circuit is stationary.

Figure 1B:
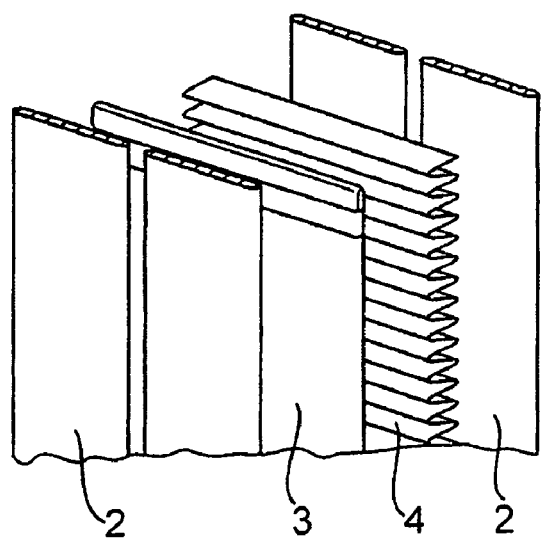
Figure 2A:
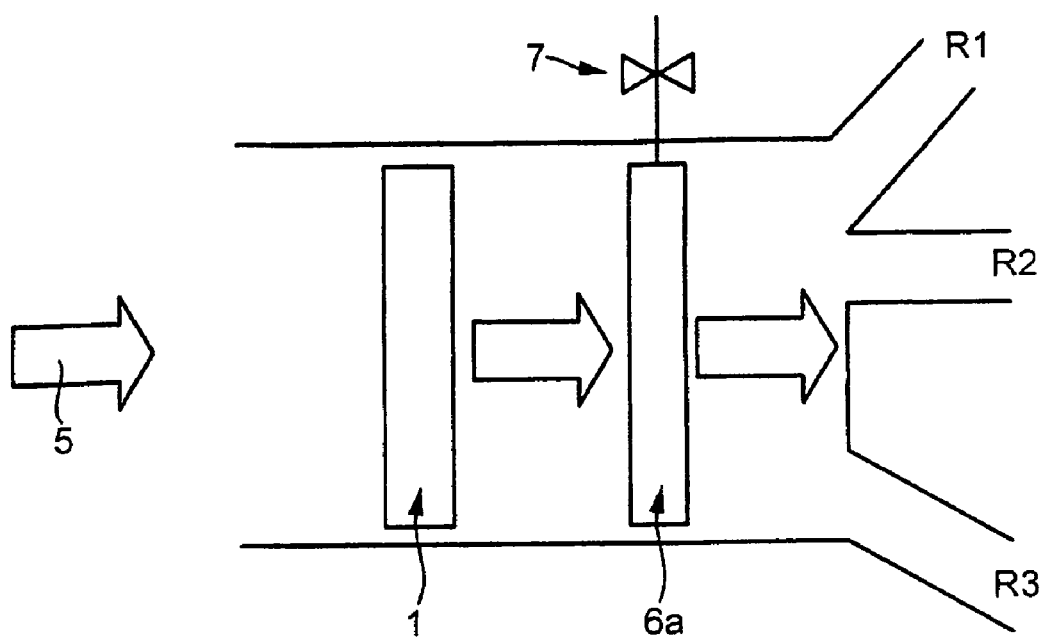
Figure 2B:
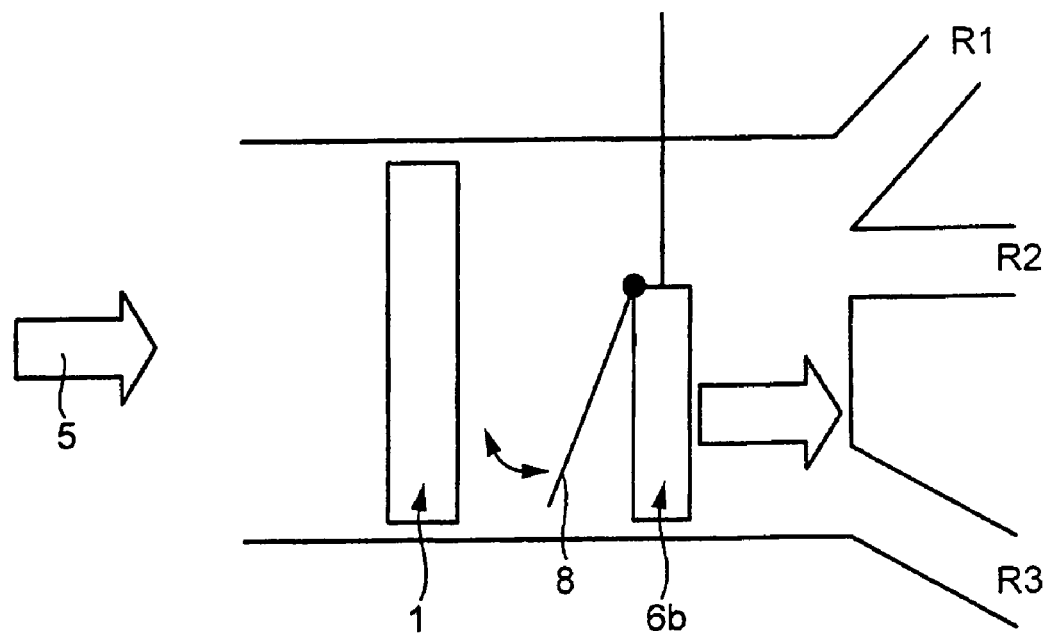
Figure 3:
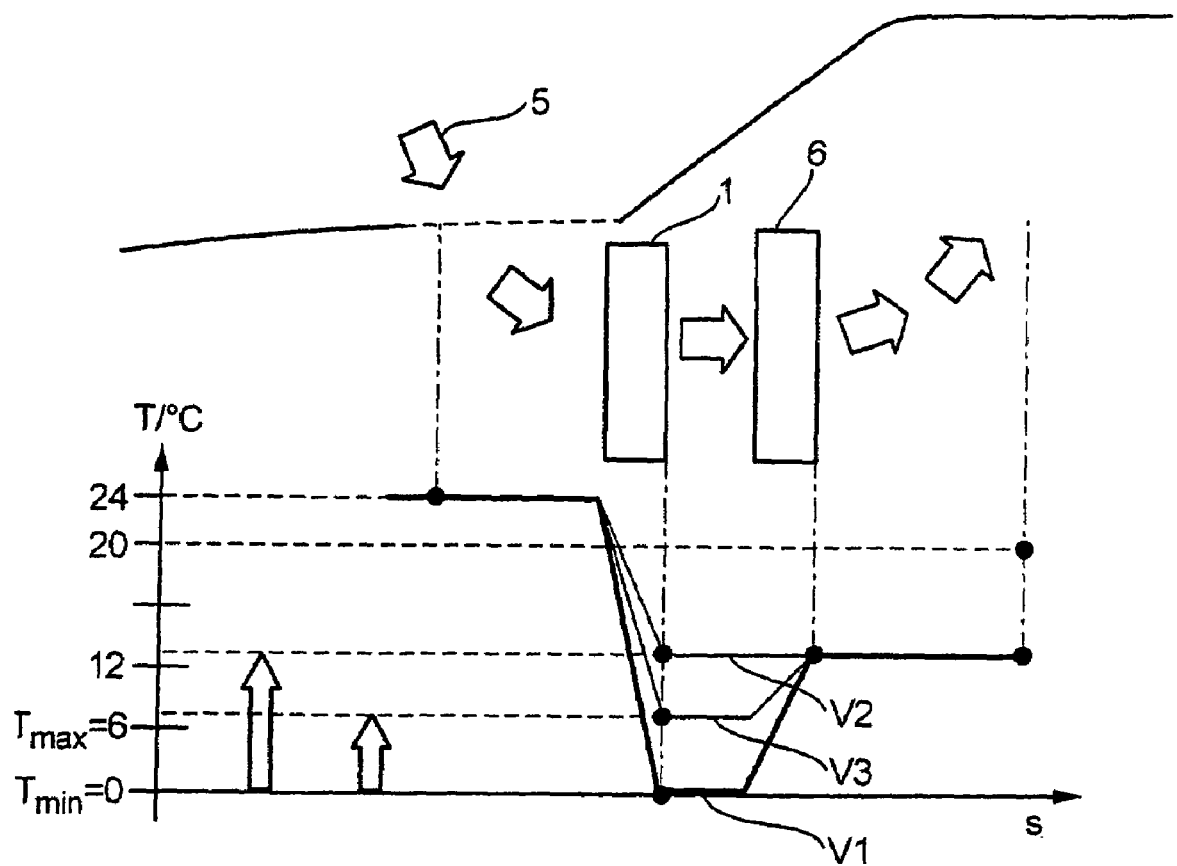

The following text provides a more detailed explanation of an exemplary embodiment of the invention with reference to a drawing, in which:

FIGS. 1a and 1b show an evaporator of a vehicle air conditioning system that is suitable for carrying out the method according to the invention, FIGS. 2a and 2b shows diagrammatic cross-sectional illustrations of in each case a device for cooling and reheating air in a vehicle air conditioning system, and FIG. 3 shows a diagram illustrating various methods for evaporator temperature control in a vehicle air conditioning system.

Corresponding parts and parameters are provided with the same reference designations throughout all the figures.

FIGS. 1a and 1b respectively show a perspective illustration and an excerpt of an exploded illustration of an evaporator 1 which is suitable for carrying out the method according to the invention and is designed as an accumulator evaporator. The basic structure of an accumulator evaporator of this type is known, for example, from DE 101 56 944 A1. The evaporator 1 includes, as part of a vehicle air conditioning system (not shown in more detail) a number of flat tubes 2, as well as refrigeration accumulator 3 and corrugated fins 4, which bear against one another in the above order, in such a manner that air which is to be cooled can flow through the evaporator 1 through the corrugated fins 4. Evaporating refrigerant, for example R 134a, flows through the flat tubes 2. The refrigeration accumulators 3, which are in each case coupled to a flat tube 2, are designed as latent refrigerant accumulators and are filled with a latent medium, for example decanol or tetradecane, as heat accumulator medium. The latent media mentioned have the advantage of not being subject to any increase in volume when they freeze. As an alternative to the flat latent refrigeration accumulators 3 provided in the exemplary embodiment shown in FIGS. 1a, 1b, it is also possible to provide any other desired refrigeration accumulators filled with a latent medium, for example in the form of capsules arranged, in particular clamped, between the tubes 2 of the evaporator 1.

The evaporation temperature in the accumulator evaporator 1 is controlled in such a manner that the latent medium always remains frozen, and therefore its enthalpy of fusion can be utilized if the refrigeration circuit is temporarily stationary, in particular in idle-stop mode. At the same time, the lower limit of the evaporation temperature is just above 0° C., in order to prevent the evaporator from icing up. A compressor whose displacement volume can be varied is used in a manner known per se, for example as proposed in DE 199 20 093 C1, to control the evaporation temperature and to adapt the power of the air conditioning system.

FIGS. 2a and 2b illustrate various methods for cooling and partially reheating the air flowing through the evaporator 1. The air which flows through the evaporator in the direction of flow 5, indicated by arrows, is intended to control the temperature of three ventilation areas R1, R2, R3 in the passenger compartment of the vehicle. In the exemplary embodiment shown in FIG. 2a, all of the air flowing through the evaporator 1 is passed to a radiator 6a, the heating power of which can be set by means of a valve 7. The valve 7 controls the flow of liquid, in particular the flow of water, through the radiator 6a. This liquid or water control sets the temperature of the air flowing into the interior of the vehicle to a desired value suitable for vehicle air conditioning.

In the exemplary embodiment shown in FIG. 2b, a radiator 6b whereof the heating power cannot be controlled is connected downstream of the evaporator 1. In this case, the air outlet temperature is controlled by means of a mixing flap 8, which is arranged between the evaporator 1 and the radiator 6b and allows any desired part-stream of the air flowing the evaporator 1 to be heated. In this case, the air conditioning system is air-controlled.

FIG. 3 shows a diagram presenting various methods for controlling the temperature in a motor vehicle air conditioning system. The figure also shows an outline illustration of a vehicle. The temperature profile of the air flowing into the vehicle is illustrated below this outline. The air temperature T is in this case recorded as a function of a flow distance s for a first conventional operating method v1, a second conventional operating method V2 and the operating method according to the invention V3. In all the methods V1, V2, V3, the ambient temperature is, for example, 24° C., the interior temperature in the vehicle is 20° C. and the air outlet temperature from the air conditioning system is 12° C. The air which is passed into the interior of the vehicle from the outside first of all flows through the evaporator 1 and then a radiator 6, as illustrated diagrammatically in FIGS. 2a and b.

The evaporation temperature cannot be controlled using the first conventional method V1. The evaporator 1 is always operated at maximum power. The air flowing through evaporator 1 is in this case cooled to approx. 0° C. Then, the air is heated again in the radiator 6 to 12° C. This first method V1 entails an unnecessarily high energy consumption.

According to the second conventional method V2, known as the ETC method, the evaporation temperature can be controlled between approx. 0° C. and approx. 12° C. In the exemplary embodiment illustrated, the air in the evaporator 1 is only cooled to 12° C. In this case, the radiator 6 connected downstream from the evaporator 1 does not function. This second method V2 is distinguished by a relatively low energy consumption. However, it is not possible by means of the second method V2 to freeze a latent medium, for example decanol or tetradecane, under all operating conditions. Therefore, the second method V2 is not suitable for a vehicle with an idle-stop operating mode.

According to the third method V3, in accordance with the invention, the temperature range within which the evaporation temperature can be controlled is restricted to the range between the minimum temperature $T_{min}$, which is fixed at approx. 0° C., and the maximum temperature $T_{max}$, which is set to 6° C. In the exemplary embodiment illustrated, the evaporator 1 cools the air flowing through it to 6° C., so that the latent medium in the latent refrigeration accumulator 3 just remains frozen. As an alternative to a latent refrigeration accumulator 3 integrated in the evaporator 1, it is also possible to use a refrigeration accumulator which is arranged between the evaporator 1 and the radiator 6 and is "charged", i.e. cooled, by the air stream cooled in the evaporator 1. The air which has been cooled to 6° C. is then reheated to 12° C. in the radiator 6. This allows economical operation of the air conditioning system, with the latent refrigeration accumulator 3 remaining permanently charged when the refrigeration compressor is running.

LIST OF DESIGNATIONS

1 Evaporator
2 Flat tube
3 Latent refrigeration accumulator
4 Corrugated fins
5 Direction of flow
6, 6a, 6b Radiator
7 Valve
8 Mixing flap
R1 to R3 Ventilation area
s Flow
T Temperature
$T_{min}$ Minimum temperature
$T_{max}$ Maximum temperature
V1 to 3 Method

The invention claimed is:

1. A method for controlling an evaporation temperature of a refrigerant in a vehicle air conditioning system which comprises a latent refrigeration accumulator which is cooled by an evaporator, the method comprising:
    setting the evaporation temperature of the refrigerant in the evaporator, as a function of demand, to a value between a minimum temperature, $T_{min}$, and a maximum temperature, $T_{max}$,
    wherein $T_{max}$ is a temperature below a phase change temperature of a latent medium in the latent refrigeration accumulator.

2. The method as claimed in claim 1, wherein the latent medium in the latent refrigeration accumulator comprises decanol.

3. The method as claimed in claim 1, wherein the latent medium in the latent refrigeration accumulator comprises tetradecane.

4. A vehicle air conditioning system operated according to the method as claimed in of claim 1.

* * * * *